US008686075B2

(12) United States Patent
Gallucci et al.

(10) Patent No.: US 8,686,075 B2
(45) Date of Patent: Apr. 1, 2014

(54) POLYSULFONE COMPOSITIONS AND METHODS FOR THE MANUFACTURE AND USE THEREOF

(75) Inventors: Robert R. Gallucci, Mt. Vernon, IN (US); James A. Mahood, Evansville, IN (US); Roy R. Odle, Mt. Vernon, IN (US); Steve Dimond, Bedford, NH (US); Eric Lee Lutz, Mt. Vernon, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 0 days.

(21) Appl. No.: 13/564,342

(22) Filed: Aug. 1, 2012

(65) Prior Publication Data
US 2014/0039102 A1 Feb. 6, 2014

Related U.S. Application Data

(60) Provisional application No. 61/526,070, filed on Aug. 22, 2011.

(51) Int. Cl.
*C08K 5/526* (2006.01)
(52) U.S. Cl.
USPC .............................. 524/147; 524/151; 524/153

(58) Field of Classification Search
USPC .......................................... 524/147, 151, 153
See application file for complete search history.

(56) References Cited

U.S. PATENT DOCUMENTS

| 3,634,355 | A | | 1/1972 | Barr |
| 4,008,203 | A | | 2/1977 | Jones |
| 4,108,837 | A | | 8/1978 | Johnson et al. |
| 4,175,175 | A | | 11/1979 | Johnson et al. |
| 4,503,168 | A | * | 3/1985 | Hartsing, Jr. .................. 523/100 |
| 4,689,134 | A | * | 8/1987 | Culkin et al. ................. 204/296 |
| 6,124,399 | A | * | 9/2000 | El-Hibri ......................... 525/67 |
| 7,273,919 | B1 | | 9/2007 | Steiger et al. |
| 7,393,914 | B2 | | 7/2008 | Moore et al. |
| 7,705,190 | B2 | | 4/2010 | Brunelle |
| 7,902,316 | B2 | | 3/2011 | Johnson et al. |
| 2007/0066738 | A1 | * | 3/2007 | Gallucci et al. ............... 524/430 |
| 2007/0292703 | A1 | * | 12/2007 | Ikuta et al. .................... 428/494 |

* cited by examiner

*Primary Examiner* — Peter Szekely
(74) *Attorney, Agent, or Firm* — Ballard Spahr, LLP

(57) ABSTRACT

This disclosure relates generally to polysulfone compositions whose residual phenolic monomers or phenolic degradation products exhibit little or no estradiol binding activity. Also disclosed are methods for making the disclosed polysulfones and articles of manufacture comprising the disclosed polysulfones.

80 Claims, No Drawings

POLYSULFONE COMPOSITIONS AND METHODS FOR THE MANUFACTURE AND USE THEREOF

CROSS REFERENCE TO RELATED APPLICATIONS

This application claims the benefit of priority to U.S. Provisional Application No. 61/526,070, filed Aug. 22, 2011, which is hereby incorporated by reference in its entirety.

FIELD OF THE INVENTION

The present disclosure relates to polysulfone compositions having, among other characteristics, significantly reduced or even no measurable level of estradiol like binding activity. Also included herein are methods for preparing and/or using the same, as well as articles formed from such compositions and blends

BACKGROUND OF THE INVENTION

Sulfone polymers are high performance amorphous thermoplastic engineering resins that contain the characteristic diaryl sulfone linkage. Sulfone polymers are known for their high mechanical strength, thermal and oxidative resistance, resistance to hydrolysis, and to many acids, bases, and solvents.

Polysulfones are well-known high temperature amorphous engineering thermoplastic resins. Among the many desirable physical characteristics and attributes of polysulfone, this polymer is transparent in its natural state. The transparency of polysulfone is useful in combination with its high heat, hydrolysis resistance and other high performance attributes. Examples of uses where the transparency is useful include covers and lids for hot serving dishes and containers, lids for medical sterilization trays, research lab animal cages, dairy processing equipment, flow meters and sight glasses for chemical process equipment.

It is known however that polymerization reactions, including those used to manufacture polysulfones, may not proceed to completion thus leading to the presence of unreacted residual monomer in the polymeric material. Besides affecting polymer properties, residual monomers can also be of concern in view of emerging regulatory considerations. Therefore, complete conversion of monomers is usually the desire of any polymer producer but is often not attainable.

Additionally, when subjected to certain conditions, polysulfones may also undergo degradation, especially under harsh conditions, potentially resulting in the formation of phenolic degradants or reaction products. The resulting degradants commonly correspond to the monomeric starting materials initially used to manufacture the polysulfone.

To that end, there remains a need in the art for thermoplastic polysulfone compositions whose residual monomer content, if any, and whose degradation products exhibit certain beneficial characteristics. Desirable characteristics of such residual monomer or degradants include, among others, relatively little or even no estradiol binding activity.

SUMMARY OF THE INVENTION

This invention relates generally to polysulfone compositions whose residual phenolic monomers or degradation products exhibit relatively little or even no estradiol binding activity. The invention also relates generally to polysulfone compositions whose residual monomer content, if any, similarly exhibits relatively little or even no estradiol binding activity. To that end, the polysulfone compositions are manufactured from monomeric starting materials that similarly exhibit relatively little or even no estradiol binding activity.

In view of the foregoing, embodiments of the invention generally provide a polysulfone composition comprising repeating units derived from the reaction of one or more aromatic dihydroxy monomers with a sulfonyl source reactant. Each of the one or more aromatic dihydroxy monomers does not exhibit a half maximal inhibitory concentration ($IC_{50}$) less than 0.00025M for alpha or beta in vitro estradiol receptors. When the polysulfone is subjected to conditions effective to provide one or more residual phenolic monomers or phenolic degradation products, each of the one or more hydrolysis products similarly does not exhibit a half maximal inhibitory concentration ($IC_{50}$) less than 0.00025M for alpha or beta in vitro estradiol receptors.

Further embodiments of the invention also provide polymer blends comprising the polysulfone compositions disclosed herein.

In another embodiment, the present invention also provides various articles of manufacture comprising the polysulfone compositions disclosed herein.

In still further embodiments, the invention provides a method for the manufacture of the disclosed polysulfone compositions. The method generally comprises reacting an aromatic dihydroxy monomer and sulfonyl source reactant under conditions effective to provide a polysulfone reaction product. According to the disclosed methods, the aromatic dihydroxy monomer is selected such that does not exhibit a half maximal inhibitory concentration ($IC_{50}$) less than 0.00025M for alpha or beta in vitro estradiol receptors. The resulting polysulfone is further characterized in that when the polysulfone is subjected to conditions effective to provide one or more residual phenolic monomers or phenolic degradation products, each of the one or more residual phenolic monomers or phenolic degradation products does not exhibit a half maximal inhibitory concentration ($IC_{50}$) less than 0.00025M for alpha or beta in vitro estradiol receptors.

Additional advantages will be set forth in part in the description which follows. The advantages will be realized and attained by means of the elements and combinations particularly pointed out in the appended claims. It is to be understood that both the foregoing general description and the following detailed description are exemplary and explanatory only and are not restrictive, as claimed.

DETAILED DESCRIPTION OF THE INVENTION

The present invention can be understood more readily by reference to the following detailed description, examples, drawings, and claims, and their previous and following description. However, before the present compositions, compounds, devices, systems, and/or methods are disclosed and described, it is to be understood that this invention is not limited to the specific compositions, compounds, devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those of ordinary skill in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "aromatic dihydroxy monomer" can include two or more such monomers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular approximated value forms another aspect of the invention. It will be further understood that the endpoints of each of the ranges are significant both in relation to the other endpoint, and independently of the other endpoint.

All ranges disclosed herein are inclusive of the endpoints and are independently combinable. The endpoints of the ranges and any values disclosed herein are not limited to the precise range or value; they are sufficiently imprecise to include values approximating these ranges and/or values. Ranges articulated within this disclosure, e.g. numerics/values, shall include disclosure for possession purposes and claim purposes of the individual points within the range, sub-ranges, and combinations thereof. As an example, for the recitation of numeric ranges herein, each intervening number there between with the same degree of precision is explicitly contemplated—for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various combinations of elements of this disclosure are encompassed by this invention, e.g. combinations of elements from dependent claims that depend upon the same independent claim.

As used herein, the terms "optional" or "optionally" mean that the subsequently described event, condition, component, or circumstance may or may not occur, and that the description includes instances where said event or circumstance occurs and instances where it does not.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "integer" means a whole number and includes zero. For example, the expression "n is an integer from 0 to 4" means n may be any whole number from 0 to 4, including 0.

As used herein, a sulfonyl source reactant refers to a sulfonyl containing compound capable of reacting with an aromatic dihydroxy monomer to provide a polysulfone. According to some embodiments, a sulfonyl source reactant can include a dihalo diaryl sulfone, such as for example, 4,4' dichloro diphenyl sulfone.

As used herein, the term half maximal inhibitory concentration ($IC_{50}$) is a quantitative measure that indicates how much of a particular substance, i.e., an inhibitor, is needed to inhibit a given biological process or component of a process, by one half. In other words, it is the half maximal (50%) inhibitory concentration (IC) of a substance (50% IC, or $IC_{50}$). It is commonly known to one of ordinary skill in the art and used as a measure of antagonist drug potency in pharmacological research. The ($IC_{50}$) of a particular substance can be determined using conventional in vitro competition binding assays. In this type of assay, a single concentration of radioligand (such as an agonist) is used in every assay tube. The ligand is used at a low concentration, usually at or below its $K_d$ value. The level of specific binding of the radioligand is then determined in the presence of a range of concentrations of other competing non-radioactive compounds (usually antagonists), in order to measure the potency with which they compete for the binding of the radioligand. Competition curves may also be computer-fitted to a logistic function as described under direct fit. The $IC_{50}$ is the concentration of competing ligand which displaces 50% of the specific binding of the radioligand.

As summarized above, the present invention provides polysulfone compositions comprising repeating sulfone units derived from reacting one or more aromatic dihydroxy monomers and a dihalo diaryl sulfone. The aromatic dihydroxy monomers exhibit relatively little or even no measurable estradiol binding activity as characterized by a determination of their half maximal inhibitory concentration ($IC_{50}$) for alpha or beta in vitro estradiol receptors. Specifically, according to some embodiments, the aromatic dihydroxy monomer of the invention do not exhibit a half maximal inhibitory concentration ($IC_{50}$) less than 0.00025M for alpha or beta in vitro estradiol receptors. According to further embodiments, the aromatic dihydroxy monomers do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, the aromatic dihydroxy monomers also do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

As will be appreciated upon practice of the present invention, any residual monomer content of the disclosed polysulfones will exhibit the half maximal inhibitory concentration ($IC_{50}$) values of the aromatic dihydroxy monomers described above. To that end, according to embodiments of the invention, the disclosed polysulfones contain a residual monomer component that is preferably less than 100 ppm. According to still further embodiments, the disclosed polysulfones contain a residual monomer content less than 95 ppm, 90 ppm, 85, ppm, 80 ppm, 75 ppm, 70 ppm, 65 ppm, 60 ppm, 55 ppm, or even less than 50 ppm. In some instances the residual phenolic monomer will be present in the polysulfone polymer some number greater than zero and less than or equal to 1,000 ppm based on the polysulfone polymer. In other instances the residual phenolic monomer will be present in the polysulfone polymer at 0.1 to 1,000 ppm. In yet other instances the residual phenolic monomer will be present in the polysulfone polymer at 1 to 1,000 ppm. In another instance the residual phenolic monomer will be less than or equal to 100 ppm.

Similarly, when the disclosed polysulfones are subjected to conditions effective for the formation of one or more degradation products, such as hydrolytic or thermal degradation, the resulting degradants will exhibit the half maximal inhibitory concentration ($IC_{50}$) values of the aromatic dihydroxy monomers described above. For example, according to some embodiments, degradants of the disclosed polysulfone will not exhibit a half maximal inhibitory concentration ($IC_{50}$) less than 0.00025M for alpha or beta in vitro estradiol receptors. According to further embodiments, degradants of the disclosed polysulfones do not exhibit a half maximal inhibitory concentration ($IC_{50}$) less than 0.0003M, 0.00035M, 0.0004M, 0.00045M, 0.0005M, 0.00075M, or even 0.001M, for alpha or beta in vitro estradiol receptors. In still other embodiments, degradants of the disclosed polysulfones do not exhibit any identifiable half maximal inhibitory concentration ($IC_{50}$) greater than or equal to about 0.00025M, 0.0003M, 0.00035M, 0.0004M, 0.00045M, 0.0005M, 0.00075M, or even 0.001M, for alpha and/or beta in vitro estradiol receptors.

The presently disclosed polysulfone compositions can be prepared according to a variety of conventionally known methods. For example thermoplastic polysulfones, polyethersulfones and polyphenylene ether sulfones may be prepared as described in U.S. Pat. Nos. 3,634,355; 4,008,203; 4,108,837 and 4,175,175, and more recently as described in U.S. Pat. Nos. 7,273,919; 7,393,914; 7,705,190 and 7,902,316. Polysulfone resins are further described in ASTM (American Society for Testing Materials) method D6394 Standard Specification for Sulfone Plastics. In these exemplified processes, a double alkali metal salt of an aromatic dihydroxy compound is typically reacted with a dihalo diaryl sulfone compound, such as dichloro diphenyl sulfone, under substantially anhydrous conditions resulting in the formation of the polysulfone by elimination of the metal chloride salt. The salt is typically filtered from the solution and then the polymer solution is either contacted with a non-solvent to precipitate the polymer or, alternatively, the polymer is recovered by evaporative removal of the solvent. In either case, the solvent removal is usually followed by forming of the polymer into pellets in an extruder, preferably a twin screw extruder.

Unlike conventional polysulfones however, as noted above the polysulfones of the present invention are derived from a select group of aromatic dihydroxy compounds that exhibit little or even no estradiol binding activity as characterized by their half maximal inhibitory concentrations ($IC_{50}$) described above. To that end according to some embodiments, aromatic dihydroxy monomers suitable for use in the polysulfones of the invention include phenolic monomers. These phenolic monomers can comprise dihydric phenols, mono phenols, bisphenols, or a combination thereof. To that end, specific examples of suitable phenolic monomers include, without limitation, resorcinol, hydroquinone, methyl hydroquinone, t-butyl hydroquinone, di-t-butyl hydroquinones (DTBHQ), biphenols, tetramethyl bisphenol-A, spiro biindane bisphenols (SBIBP), bis-(hydroxy aryl)-N-aryl isoindolinones, or any combination thereof. It should be understood that, in view of this disclosure, any additional suitable aromatic dihydroxy monomers exhibiting a lack of estradiol binding activity characterized by the half maximal inhibitory concentration values described above can be used.

The polysulfones of the present invention can be provided as homopolymers comprising repeating units derived from a single aromatic dihydroxy monomer. Alternatively, in other embodiments, the polysulfones of the invention can be provided as co-polysulfones, comprising repeating units derived from two or more aromatic dihydroxy monomers as described herein. According to these embodiments, it should be understood that the disclosed co-polysulfones can be formulated to provide any desired relative mole ratio of repeating units within the chain of co-polysulfones. Blends of any polysulfone homopolymers or copolymers are also contemplated. In some instance the polysulfone will be a polyphenylene ether sulfone (PPSU) derived from a dihalo sulfone and biphenol.

The relative mole ratio among the various monomeric components present in a copolymer will depend, in part, upon the total number of differing monomeric components present. The mole ratios can be expressed as relative mole percentages whereby the total mole percentage of monomeric components adds up to 100 mole %. For example, a copolymer comprising a blend of a first aromatic dihydroxy monomer and a second aromatic dihydroxy monomer can be provided wherein the relative mole percentage ratio of the first monomer to the second monomer is 90 mole % to 10 mole %, 80 mole % to 20 mole %, 75 mole % to 25 mole %, 70 mole % to 30 mole %, 60 mole % to 40 mole %, or even 50 mole % to 50 mole %.

In addition to the structural units described above, it is further contemplated that the polysulfones of the present invention can comprise one or more non-polysulfone additives. Preferably, the one or more non-polysulfone additive also does not exhibit a half maximal inhibitory concentration ($IC_{50}$) less than 0.00025M for alpha or beta in vitro estradiol receptors. To that end, exemplary and non-limiting additives that can be incorporated into the polysulfones include stabilizers, antioxidants, colorants, impact modifiers, flame retardants, branching agents, anti drip additives, mold release additives, lubricants, plasticizers, minerals, reinforcement additives such as carbon or glass fibers, or any combination thereof. The amount of any such additive that can be used is that amount sufficient to result in the desired degree or effect for which the additive is intended. For example, if the additive is an antioxidant, color stabilizer or flame retardant the amount of additive will be that amount sufficient to provide a desired level of intended performance e.g. resistance to thermal aging, lower color or resistance to ignition. Such amounts can be readily determined by one of ordinary skill in the art without undue experimentation.

Any one or more of the above referenced non-polysulfone additives can be provided as a phosphorous containing compound. Exemplary phosphorous containing compounds including phosphites, phosphonates, phosphates, or a combination thereof. Thus, according to embodiments of the invention where phosphorous containing additives are present, it is preferable that the particular phosphorous containing additive similarly does not exhibit a half maximal inhibitory concentration ($IC_{50}$) less than 0.00025M for alpha or beta in vitro estradiol receptors. To that end, when such phosphorous containing additives are subjected to a hydrolysis reaction under conditions effective to provide one or more hydrolysis products, the hydrolysis product will similarly not exhibit a half maximal inhibitory concentration ($IC_{50}$) less than 0.00025M for alpha or beta in vitro estradiol receptors.

According to embodiments of the invention, suitable phosphite additives include diphenyl alkyl phosphites, phenyl dialkyl phosphites, trialkyl phosphites, dialkyl phosphites, triphenyl phosphites, diphenyl pentaerythritol diphosphite, or any combination thereof. The phosphite or phosphonate additives can be present in any desired or effective amount, when used as additives the phosphite, phosphonate or combinations thereof are preferably present in an amount in the range of from 0.00001 to 0.3 wt % phosphite, 0.00001 to 0.2 wt % phosphite, or even in the range of from 0.0001 to 0.01 wt % phosphite. Still further, it should be understood that a phosphorous containing additive such as a phosphite additive can have any desired molecular weight. However, according to a preferred embodiment, the phosphite additive has a molecular weight that is greater than 200 Daltons.

According to further embodiments of the invention the phosphorus compound can be a phosphate. Suitable phosphate additives include triphenyl phosphate, resorcinol phenyl diphosphate, spirobiindane phenyl diphosphate, di-tert-butyl hydroquinone phenyl diphosphate, biphenol phenyl diphosphate, hydroquinone phenyl diphosphate, or any combination thereof.

The phosphates are especially useful in flame retardant polysulfone rubber modified blends for instance Polysulfone-ABS, Polysulfone-MBS, Polysulfone acrylic rubber, or Polysulfone-ABS-MBS blends. Aryl phosphates are preferred and may be used at 1 to 30 wt % of the composition. In other instances 5 to 20 wt % aryl phosphate will be present. In yet other instances the aryl phosphate will have a molecular weight from 300 to 1500 Daltons. It should also be understood that, in view of this disclosure, any additional suitable phosphorous containing additive, or hydrolysis product thereof, exhibiting a lack of estradiol binding activity characterized by the half maximal inhibitory concentration values described above can be used. Conventional polymerization processes for manufacturing polysulfones also commonly employ the use of a chain stopper (also referred to as an endcapping agent) during the polymerization reaction. The chain stopper limits molecular weight growth rate, and thus can be used to controls molecular weight in the polysulfone. To that end, some conventionally known end capping agents exhibit undesirably high levels of estradiol binding activity. In contrast, however, suitable end capping agents or chain stoppers suitable for use with the present invention exhibit estradiol binding activity levels similar or even identical to that of the selected aromatic dihydroxy monomers. More specifically, the end capping agents suitable for use in the present invention also do not exhibit a half maximal inhibitory concentration ($IC_{50}$) less than 0.00025M for alpha or beta in vitro estradiol receptors. As such, such a hydrolytic or thermal degradation product of the selected chain stopper will likewise not exhibit a half maximal inhibitory concentration ($IC_{50}$) less than 0.00025M for alpha or beta in vitro estradiol receptors. Exemplary chain stoppers include certain alkyl halides, alkyl sulfates, mono-phenolic compounds and the like. In a preferred embodiment, a suitable chain stopper for use in the present invention is phenol. Thus, when phenol is included as a chain stopper, the resulting polysulfone comprises phenol as an end cap to the polymer chain. When, for instance methyl chloride is used as an end capping agent the end group is a methyl phenyl ether linkage.

It should be understood that the polysulfones disclosed herein can be produced having any desired molecular weight (Mw) with any desired end cap. For example, according to some embodiments, disclosed polysulfones can have molecular weights in the range of from 3,000 to 80,000 Daltons, including exemplary molecular weights of, 4,000, 5,000, 10,000, 15,000, 20,000, 25,000, 30,000, 35,000, 40,000 and 45,000, 50,000, 55,000, 60,000, 65,000, 70,000 and 75,000. In still further examples, the molecular weight of a disclosed polysulfone can be in a range of from any one of the above mentioned values to any other of the above mentioned values. For example, molecular weight of a disclosed polysulfone can be in the range of from 5000 to 50,000 Daltons. In still a further example, the molecular weight of a disclosed polysulfone can be expressed as a value less than any one of the above disclosed values or, alternatively, can be expressed as a value greater than any one of the above disclosed values. For example, the molecular weight of a disclosed polysulfone can be greater than 3000 Daltons, or less than 80,000 Daltons. Molecular weight may be determined by gel permeation chromatography (GPC) as described in American Society for Testing Materials (ASTM) method D5296.

Residual monomer content can be measured using standard techniques, such as gas or liquid chromatography, on an extract of the polymer. The extract can also be titrated to determine phenolic content. Chloride content can be determined for example by analysis of an aqueous extract of the polymer using for example ion chromatography (IC). Metals, including transition metals, and total chloride can be determined by pyrolysis/ashing of the sample followed by ion plasma chromatography (ICP) or other known techniques. Phenolic end groups of the polymer may be measured by known techniques such as titration, infrared spectroscopy (IR), and nuclear magnetic resonance (NMR). In one instance $^{31}$P NMR analysis using phosphorous functionalization of end groups can be was used to characterize the resins. Wherein the polysulfone resin was dissolved in $CDCl_3$ with pyridine and chromium acetylacetonate (CrAcAc) and the phenolic hydroxyl groups are phosphorylated with o-phenylene phosphorochloridite to enhance the NMR signal.

As used in the specification and claims herein, the term "compounding" refers to the intimate mixing of the polysulfone and non-polysulfone additives such as the phosphorous containing compound prior to preparation of a final product or article. Compounding is commonly performed by combining as-synthesized polysulfone with the additive(s) and passing the mixture through an extruder to produce compounded pellets that can be dried and then further processed, for example into shaped articles. When dried, the pellets preferably have a moisture content less than about 100 ppm. The additive(s) can be combined with the as-synthesized polysulfone prior to any pelletizing, or after pelletization of the as-synthesized polysulfone.

Compounding can be performed either in a melt or in solution. In the melt, the polysulfone and additives can be melt mixed or kneaded together in an extruder, melt kneader, reactor or other system or device capable of melting and mixing the polysulfone and the additives, followed by extrusion or pelletization, or by direct melt processing into shaped articles. In solution processing, the polysulfone and additive(s) are combined in an inert solvent and maintained together for sufficient reaction time and temperature, for instance, to reduce the color of the composition. The solvent is then removed, for example using vacuum.

The temperature of the extruder in the foregoing methods will generally be the conventional extruder temperature used for forming pellets of a particular polysulfone. The appropriate extruder temperature will depend on the properties of both the polysulfone and the additives. Higher molecular weight polysulfones and/or high heat polysulfones containing monomer units that increase the glass transition temperature of the polysulfone will typically require higher extruder temperatures, so that the melt viscosity is low enough for sufficient mixing with the additives to occur. Suitable temperature ranges are typically in the range of from 275 to 375° C., including for example the range of from 300 to 340° C. One skilled in the art will understand that the temperature of the polymer melt can vary somewhat from the extruder temperature depending on the occurrence of exothermic and/or endothermic reactions and processes and any heat generated by the mechanical mixing of the molten polymer. In some instances the polysulfone will have less than 100 ppm moisture.

The polysulfone compositions of the invention can further be blended with additional thermoplastic resins or polymers. For example, and without limitation, the polycarbonates of the invention can be blended with polyester (for example polybutylene terephthalates, polyethylene terephthalates, poly cyclohexane dimethanol terephthalates, polypropylene terephthalates, polylactic acid), polyarylates, styrene acrylonitriles (SAN), acrylonitrile butadiene styrenes (ABS), methyl methacrylates (PMMA), methacrylate butadiene styrenes (MBS), styrene maleic anhydrides (SMA), acrylic rubber, styrene butadiene styrenes (SBS), styrene ethylene butadiene styrenes (SEBS), polystyrenes (PS), polyolefins (for example polypropylene, polyethylene, high density polyethylene, linear low density polyethylene, low density polyethylene and polyolefin copolymers), polyetherimide (PEI), polyetherimide sulfone (PEIS) or any combination thereof.

The polysulfones of the present invention are well suited for a variety of uses, including the manufacture of various articles. For example, and without limitation, the polysulfone compositions of the invention can be used as either clear or opaque resins for medical uses, food service and processing uses, housewares, electronics, packaging, computer enclosures, trays, drinking glasses, pitchers, medical equipment, test, tubes and lab equipment, syringes, light fixtures, plumbing fixtures, electronic devices, connectors, cell phone housings, snap fit connectors, keycaps, animal cages, filter housings, pipes, dairy equipment, aerospace and aviation applications, handles, bottles, films, coatings, and the like.

Specific non-limiting examples of polysulfone compositions of the invention are illustrated below. In one embodiment, a polysulfone is disclosed wherein the repeating sulfone subunits are derived from the reaction of dichloro diphenyl sulfone with di-tert butyl hydroquinone. Phenol can also be selected as the desired chain stopper. Other end groups, for instance methyl (—CH3) are also contemplated. The resulting polysulfone structure is shown below, wherein "n" can be any desired integer based upon the desired chain length for the co-polysulfone

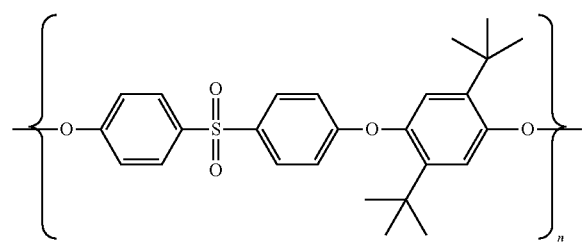

It is contemplated that this exemplified polysulfone, and others disclosed herein, can be obtained having a Mw in the range of from 10,000 to 120,000 Daltons; a phenolic group content less than 20 meq/kg; a chloride content less than 20 ppm; a transition metal content less than 20 ppm; and a residual monomer content less than 100 ppm.

In another embodiment, a polysulfone is disclosed wherein the repeating sulfone subunits are derived from the reaction of dichloro diphenyl sulfone with spiro biindane bisphenol (SBIBP). Phenol can again be selected as the desired chain stopper. Other end groups, for instance methyl (—CH3) are also contemplated. The resulting polysulfone structure is shown below, wherein "n" can be any desired integer based upon the desired chain length for the polysulfone.

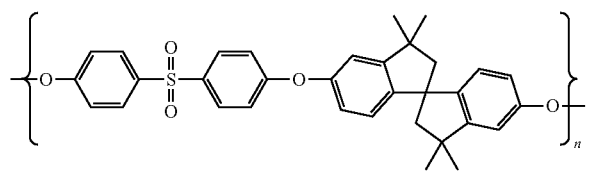

It is contemplated that this exemplified polysulfone, and others disclosed herein, can be obtained having a Mw in the range of from 10,000 to 120,000 Daltons; a phenolic group content less than 20 meq/kg; a chloride content less than 20 ppm; a transition metal content less than 20 ppm; and a residual monomer content less than 100 ppm.

In another embodiment, a polysulfone is disclosed wherein the repeating sulfone subunits are derived from the reaction of dichloro diphenyl sulfone with resorcinol. Phenol can again be selected as the desired chain stopper. Other end groups, for instance methyl (—CH3) are also contemplated. The resulting polysulfone structure is shown below, wherein "n" can be any desired integer based upon the desired chain length for the polysulfone.

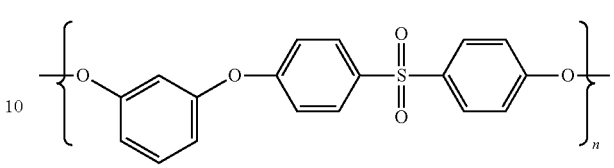

It is contemplated that this exemplified polysulfone, and others disclosed herein, can be obtained having a Mw in the range of from 3,000 to 80,000 Daltons; a phenolic group content less than 20 meq/kg; a chloride content less than 20 ppm; a transition metal content less than 20 ppm; and a residual monomer content less than 100 ppm.

In still another embodiment, a polysulfone is disclosed wherein the repeating sulfone subunits are derived from the reaction of dichloro diphenyl sulfone with N-phenyl phenolphthalein bisphenol. Phenol can again be selected as the desired chain stopper. Other end groups, for instance methyl (—CH3) are also contemplated. The resulting polysulfone structure is shown below, wherein "n" can be any desired integer based upon the desired chain length for the polysulfone.

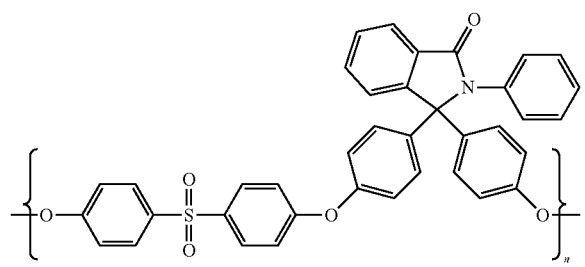

It is contemplated that this exemplified polysulfone, and others disclosed herein, can be obtained having a Mw in the range of from 10,000 to 120,000 Daltons; a phenolic group content less than 20 meq/kg; a chloride content less than 20 ppm; a transition metal content less than 20 ppm; and a residual monomer content less than 100 ppm.

In still further embodiments, exemplary co-polysulfones are disclosed wherein the repeating sulfone subunits are derived from two or more selected aromatic dihydroxy monomers. For example, a co-polysulfone is disclosed wherein the repeating sulfone subunits are derived from the reaction of dichloro diphenyl sulfone with resorcinol and N-phenyl phenolphthalein bisphenol. Phenol can again be selected as the desired chain stopper. Other end groups, for instance methyl (—CH3) are also contemplated. The resulting polysulfone structure is shown below, wherein "n" can be any desired integer based upon the desired chain length for the co-polysulfone.

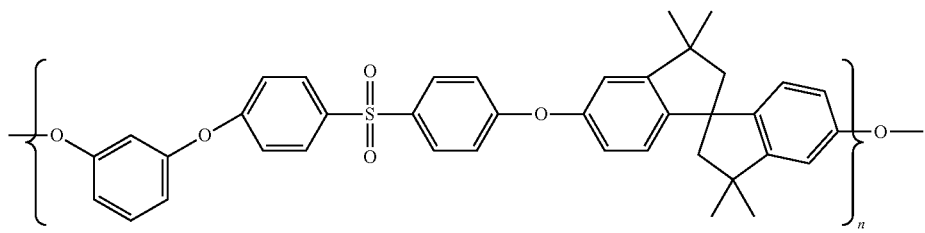

It is contemplated that this exemplified co-polysulfone, and others disclosed herein, can be obtained having a Mw in the range of from 10,000 to 120,000 Daltons; a phenolic group content less than 20 meq/kg; a chloride content less than 20 ppm; a transition metal content less than 20 ppm; and a residual monomer content less than 100 ppm.

In still another embodiment, a co-polysulfone is disclosed wherein the repeating sulfone subunits are derived from the reaction of dichloro diphenyl sulfone with resorcinol and spiro biindane bisphenol (SBIBP). Phenol can again be selected as the desired chain stopper. Other end groups, for instance methyl (—CH3) are also contemplated. The resulting polysulfone structure is shown below, wherein "n" can be any desired integer based upon the desired chain length for the co-polysulfone.

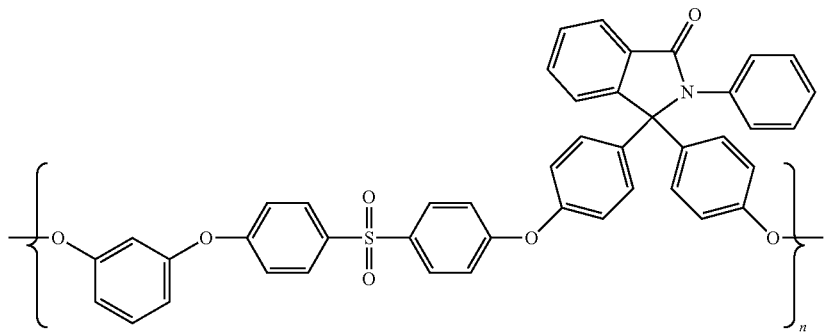

It is contemplated that this exemplified co-polysulfone, and others disclosed herein, can be obtained having a Mw in the range of from 10,000 to 120,000 Daltons; a phenolic group content less than 20 meq/kg; a chloride content less than 20 ppm; a transition metal content less than 20 ppm; and a residual monomer content less than 100 ppm.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some normal experimental variation should be accounted for. Unless indicated otherwise, parts are parts by weight, temperature is in C or is at ambient temperature, and pressure is at or near atmospheric. Examples of the invention are designated by numbers, control experiments are designated by letters.

Utilizing a conventional in vitro competitive binding assay as described above, estradiol binding activity as quantified by the half maximal inhibitory concentration ($IC_{50}$) value, was evaluated for various phenolic compounds capable of use as component starting materials in the manufacture of polysulfones. These component starting materials might remain as residual polymer in the polymer during polymerizations run under certain conditions. Additionally, degradation products such as a hydrolysis or thermal degradation product of a polysulfone could comprise one or more of these component starting materials. Specifically, ($IC_{50}$) binding concentrations for the alpha or beta in vitro estradiol receptors for various compounds were tested. Three separate sets of tests were run using a standard competitive binding assay. Samples were dissolved in either ethanol or DMSO. The various phenolic compounds were then tested at seven different concentrations of each test phenolic compound. Each of those tests was run in triplicate. Tests were conducted by displacement of a radioligand. For each set of tests a 17b-estradiol control sample was run to ensure proper binding of the natural hormone under the test conditions.

The polysulfone aromatic dihydroxy monomers or hydrolysis products to be tested (Tables 1 to 3) were investigated as to their binding affinity for recombinant human estradiol receptors (rhER) alpha (α) and beta 1 (β1) in vitro. 17β-Estradiol ($E_2$) was used a standard whose relative binding affinity was defined as 100%. Competitive binding assays were performed by incubating rhER alpha (α) and beta 1 (β1) receptors with 10 nM [$^3$H] estradiol (radioligand) in the presence or absence of increasing concentrations, 0.25 to 250,000 nM, of the phenolic test compounds of Tables 1 to 3 (nM is nano molar). Each data point is the average of at least two assays. Stock solutions of the compounds of Tables 1 to 3 were prepared at 10×E-2 M in 100% ethanol, water or DMSO (dimethyl sulfoxide). Compounds were diluted 10 fold in binding buffer and then 1:4 in the final assay mix. The final concentration of ethanol or DMSO in the assay well was 5%. The highest concentration of the hydrolysis test compound was 2.5×E-4 M (250,000 nM). The potential residual monomer or hydrolysis compounds of Tables 1 to 3 were tested at up to seven concentrations over log increments. The lowest concentration was 2.5×E-10 M (0.25 nM). The IC50 is the concentration of test substance at which about 50% of the radio labeled estradiol was displaced from the estradiol receptor.

In some very surprising instances (see Tables 1 to 3) the disparate phenolic compounds: tetra methyl bisphenol-A (TMBPA), phenol, N-phenyl phenolphthalein bisphenol (PP-PBP), resorcinol, biphenol (BP), spiro biindane bisphenol (SBIBP), di t-butyl hydroquinone (DTBHQ) and methyl hydroquinone show no estradiol binding, even at the highest concentration. In terms of their ability to bind to alpha or beta estradiol hormone receptors these phenolic compounds show a surprising reduction in activity. In some instances no binding can be measured using standard biochemical analysis techniques to test estradiol binding activity. That is even at a concentration of 2.5×E-4 M there was no displacement of estradiol at the highest concentration (250,000 nM) tested. That is, there was no estradiol displacement and hence no IC50 could be determined, the IC50, if there is displacement at all, may be some value greater than 2.5×E-4M.

The estradiol displacement experiments of set 1 (Table 1) show that the phenolic compounds; p-cumyl phenol (control example B), dihydroxy diphenyl ether (control example C), bisphenol acetophenone (control example D), dimethyl acetophenone bisphenol (control example E), diphenolic acid methyl ester (control example F) and dimethyl cyclohexyl bisphenol (control example G) all displace estradiol at low concentrations. However, surprisingly, tetra methyl BPA (Example 1), phenol (Example 2), N-phenolphthalein bisphenol (Example 3) and resorcinol (Example 4) show no detectible estradiol displacement under the same conditions either the alpha or beta estradiol receptor at as high as 2.5×E-4 molar concentration.

TABLE 1

Experimental Set 1

| Example | Compounds | IC50 rhER alpha | IC50 rhER beta |
|---|---|---|---|
| A | 17b-estradiol control | 1.0 × E-9 | 8.2 × E-9 |
| B | p-Cumyl Phenol (CAS# 599-64-4) | 1.4 × E-4 | 9.8 × E-6 |
| C | Dihydroxy Diphenyl Ether (CAS# 1965-09-9) | 6.0 × E-5 | 1.4 × E-5 |
| D | Bisphenol Acetophenone (CAS# 1571-75-1) | 1.2 × E-5 | 1.4 × E-6 |
| E | Dimethyl Acetophenone Bisphenol (CAS# 4754-63-6) | 4.8 × E-6 | 3.5 × E-6 |
| F | Diphenolic Acid Methyl Ester (CAS# 7297-85-0) | 1.9 × E-5 | 1.1 × E-5 |
| G | Dimethyl Cyclohexyl Bisphenol (CAS# 2362-14-3) | 1.3 × E-6 | 3.1 × E-6 |
| 1 | Tetra Methyl BPA (CAS# 5613-46-7) | >2.5 × E-4 | >2.5 × E-4 |
| 2 | Phenol (CAS# 108-95-2) | >2.5 × E-4 | >2.5 × E-4 |
| 3 | N-Phenyl Phenolphthalein Bisphenol (CAS# 6607-41-6) | >2.5 × E-4 | >2.5 × E-4 |
| 4 | Resorcinol (CAS# 108-46-3) | >2.5 × E-4 | >2.5 × E-4 |

IC50 is the conc. of the candidate that displaces 50% of the radioactive ligand from the rhER cells >2.5 × E4 compounds did not compete to the extent of 50% with radiolabeled 17B-estradiol at the highest conc. (250,000 nM) tested, no IC50 can be determined estradiol. Note that 17b-estradiol binds at very low concentrations of 1.0 to 14.7×E-9 M in our various control experiments and is much more active than any of the compounds tested.

The (IC$_{50}$) values obtained from these experiments are provided in the tables below. As shown, many mono and bisphenols show an undesired high level of receptor binding. However very surprisingly the preferred phenolic compounds utilized to prepare the polyetherimide compositions of the invention (tetra methyl bisphenol-A (TMBPA), phenol, N-phenyl phenolphthalein bisphenol (PPPBP), resorcinol, biphenol (BP), spiro biindane bisphenol (SBIBP), di t-butyl hydroquinone (DTBHQ) and methyl hydroquinone) either did not show any detectable estradiol binding in these tests or, at a minimum, did not exhibit an (IC$_{50}$) binding concentrations less than 2.5×E-4 M. An entry of >2.5×E-4 for compounds in Tables 1 to 3 indicates that those compounds did not compete to the extent of 50% with radio labeled 17b-estradiol In a second set of experiments (Table 2) phenolic compounds structurally similar to, but not identical to those of set 1, were tested as to their ability to displace estradiol. The surprising and unpredictable trend of estradiol displacement is again observed. The bis phenolic compounds: fluorenone bis o-cresol (control example I), hydro isophorone bisphenol (control example J), bisphenol M (control example K), and bis hydroxy phenyl menthane (control example L) all displace estradiol at low concentrations. On the other hand, spiro biindane bisphenol (Example 5), biphenol (Example 6) and di-2,5-tert-butyl hydroquinone (Example 7) all show no displacement of the estradiol at the alpha receptor at 2.5×E-4 M concentration. Examples 5 and 7 also show no displacement at the beta receptor. 17b-Estradiol (control examples A and H) binds at a very low concentration.

TABLE 2

Experimental Set 2

| Example | Compounds | IC50 rhER alpha | IC50 rhER beta |
|---|---|---|---|
| H | 17b-estradiol control | 7.0 × E-9 | 6.6 × E-9 |
| I | Fluorenone Bis-o-Cresol (CAS# 88938-12-9) | 9.7 × E-6 | 2.5 × E-5 |
| J | Hydro Isophorone Bisphenol (CAS# 129188-99-4) | 4.5 × E-7 | 1.1 × E-6 |
| K | Bisphenol M (CAS# 13595-25-0) | 2.1 × E-6 | 1.4 × E-6 |
| L | Bis Hydroxy Phenyl Menthane (CAS# 58555-74-1) | 4.9 × E-7 | 6.7 × E-7 |
| 5 | Spiro Biindane Bisphenol (CAS# 1568-80-5) | >2.5 × E-4 | >2.5 × E-4 |
| 6 | Biphenol (CAS# 92-88-6) | >2.5 × E-4 | 1.7 × E-6 |
| 7 | Di t-Butyl Hydroquinone (CAS# 88-58-4) | >2.5 × E-4 | >2.5 × E-4 |

IC50 is the conc. of the candidate that displaces 50% of the radioactive ligand from the rhER cells
>2.5 × E4 compounds did not compete to the extent of 50% with radiolabeled 17B-estradiol at the highest conc. (250,000 nM) tested, no IC50 can be determined In yet another set of experiments (Table 3) undesirable estradiol displacement at low concentration is observed for the bisphenols benzophenone bisphenol (control example N) and phenolphthalein (control example O) while methyl hydroquinone (Example 8) surprisingly shows no alpha or beta estradiol displacement at as high as 2.5×E-4 molar concentration. As in the other sets of experiments (Tables 1 to 3) an estradiol control (example M) was run as part of the set to establish a baseline of estradiol displacement. Estradiol displaces at much lower concentration than any of the phenolic compounds.

TABLE 3

Experimental Set 3

| Example | Compounds | IC50 rhER alpha | IC50 rhER beta |
|---|---|---|---|
| M | 17b-estradiol control | 10.0 × E-9 | 14.7 × E-9 |
| N | Benzophenone bisphenol (CAS# 611-99-4) | 3.1 × E-5 | 3.2 × E-6 |
| O | Phenolphthalein (CAS# 77-09-8) | 3.7 × E-6 | 1.4 × E-5 |
| 8 | Methyl Hydroquinone (CAS# 95-71-6) | >2.5 × E-4 | >2.5 × E-4 |

IC50 is the conc. of the candidate that displaces 50% of the radioactive ligand from the rhER cells
>2.5 × E4 compounds did not compete to the extent of 50% with radiolabeled 17B-estradiol at the highest conc. (250,000 nM) tested, no IC50 can be determined The estradiol binding of phenolic compounds seems to be very unpredictable. It does not correlate with molecular weight, phenolic group separation, molecular rigidity, solubility, steric hindrance or electronic effects. Note that while the phenolic compounds of our invention show no displacement at the alpha or beta estradiol binding sites at concentration below the 2.5×E-4M limit of detection, even the control examples, while showing some binding, are not as reactive as estradiol (control examples A, H and M). 17b-Estradiol binds at a very low concentration Examples 9 to 15 show the synthesis and characterization of various polysulfones made from the bis phenolic compounds described above which show no displacement at the alpha or beta estradiol binding sites at concentration below the 2.5×E-4M limit of detection

Example 9

MHQ Polysulfone

To a 3-neck, 250 mL round bottom flask was added 16.9865 grams (0.5915 mol) of 4,4'-dichlorodiphenyl sulfone, 7.2343 grams (0.5828 mol) of methyl hydroquinone (MHQ), 8.8020 grams (0.06369 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which served to mix the contents. Separately, 35 mL of sulfolane and 35 mL of toluene were combined in a graduated cylinder and degassed for 15 minutes with nitrogen gas and later combined with the contents in the flask. To the flask was equipped a 25 mL, dean-stark trap with return, and an overhead condenser cooled by water. The entire apparatus was purged with nitrogen gas for 5 minutes prior to being placed in to an oil bath maintained at 150° C. Toluene was distilled overhead to dry the reaction mixture, and water in the bottom phase of the dean-stark was discarded. No overheads were returned to the flask. The reaction mixture was kept at 150° C. for 4 hours, before the oil bath was raised to 200° C. and left for 14 hours. A sample was taken for GPC analysis and the reaction mixture was diluted with 124 mL of a degassed, 50/50 solution of toluene/sulfolane and cooled to 90° C. 0.1515 grams (0.00168 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, round-bottomed flask to afford a transparent solution. The solution was cooled to 40° C. prior to precipitation in to 600 mL of 75/25 (MeOH/0.1N $H_2O$). A handheld, stainless steel homogenizer provided agitation and grinding. The polymer was isolated from the anti-solvent by vacuum filtration through a Whatman 4 filter, washed with 4×25 mL portions of dH2O, collected in to an aluminum pan, and dried in vacuo at 130° C. overnight. Mw: 45,000, Mn: 12,400 Daltons. The Tg was 193.3° C.

Example 10

MHQ-SBI (50/50) Polysulfone

To a 3-neck, 250 mL round bottom flask was added 13.3497 grams (0.04649 mol) of 4,4'-dichlorodiphenyl sulfone, 2.8513 grams (0.02297 mol) of methyl hydroquinone (MHQ), 7.0856 grams (0.02297 mol) of spirobiindane bisphenol (SBI), and 6.9944 grams (0.05061 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which served to mix the contents. Separately, 35 mL of sulfolane and 35 mL of toluene were combined in a graduated cylinder and degassed for 15 minutes with nitrogen gas and later combined with the contents in the flask. To the flask was equipped a 25 mL, dean-stark trap with return, and an overhead condenser. The entire apparatus was purged with nitrogen gas for 5 minutes prior to being placed in to an oil bath maintained at 150° C. Toluene was distilled overhead to dry the reaction mixture, and water in the bottom phase of the dean-stark was discarded. No overheads were returned to the flask. The reaction mixture was kept at 150° C. for 4 hours, before the oil bath was raised to 200° C. and left for 14 hours. A sample was taken for GPC analysis and the reaction mixture was diluted with 124 mL of a degassed, 50/50 solution of toluene/sulfolane and cooled to 90° C. 0.3028 grams (0.00336 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, round-bottomed flask to afford a transparent solution. The solution was allowed to cool to 40° C. prior to precipitation in to 600 mL of 75/25 (MeOH/0.1N $H_2O$). A handheld, stainless steel homogenizer provided agitation and grinding. The polymer was isolated from the anti-solvent by vacuum filtration through a Whatman 4 filter, washed with 4×25 mL portions of $dH_2O$, collected in to an aluminum pan, and dried in vacuo at 130° C. overnight. Mw: 59,000, Mn: 13,000 Daltons, Tg was 179.6° C.

Example 11

MHQ-PPPBP (50/50) Polysulfone

To a 3-neck, 250 mL round bottom flask was added 12.1529 grams (0.04232 mol) of 4,4'-dichlorodiphenyl sulfone, 2.5811 grams (0.0208 mol) of methyl hydroquinone (MHQ), 8.2344 grams (0.02093 mol) of N-phenyl phenolphthalein bisphenol (PPPBP), and 6.3283 grams (0.04579 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which served to mix the contents. Separately, 35 mL of sulfolane and 35 mL of toluene were combined in a graduated cylinder and degassed for 15 minutes with nitrogen gas and later combined with the contents in the flask. To the flask was equipped a 25 mL, dean-stark trap with return, and an overhead condenser. The entire apparatus was purged with nitrogen gas for 5 minutes prior to being placed in to an oil bath maintained at 150° C. Toluene was distilled overhead to dry the reaction mixture, and water in the bottom phase of the dean-stark was discarded. The reaction mixture was kept at 150° C. for 4 hours, before the oil bath was raised to 200° C. and left for 14 hours. A sample was taken for GPC analysis and the reaction mixture was diluted with 124 mL of a degassed, 50/50 solution of toluene/sulfolane and cooled to 90° C. 0.2131 grams (0.00237 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, round-bottomed flask to afford a transparent solution. The solution was allowed to cool to 40° C. prior to precipitation in to 600 mL of 75%/25% MeOH/0.1N $H_2O$. A handheld, stainless steel homogenizer provided agitation and grinding. The polymer was isolated from the anti-solvent by vacuum filtration through a Whatman 4 filter, washed with 4×25 mL portions of $dH_2O$, collected in to an aluminum pan, and dried in vacuo at 130° C. overnight. Mw: 70,400, Mn: 18,900 Daltons, Tg was 228.9° C.

Example 12

DTBHQ Polysulfone

To a 3-neck, 250 mL round bottom flask was added 11.6530 grams (0.04581 mol) of 4,4'-difluorodiphenyl sulfone, 10.0916 grams (0.04539 mol) of 2,5-di-t-butylhydroquinone (DTBHQ), 7.0341 grams (0.05090 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which mixed the contents. To the flask was equipped a 25 mL, dean-stark trap with return, and an overhead condenser. Separately, 37 mL of sulfolane and 25 mL of toluene were combined in a graduated cylinder and degassed for 15 minutes with nitrogen gas and was later added to the flask. The entire apparatus was purged with nitrogen gas for 5 minutes prior to being placed in to an oil bath maintained at 130° C. Toluene was distilled overhead to dry the reaction mixture, and water in the bottom phase of the dean-stark was discarded. The reaction mixture was kept at 130° C. for 4 hours, before the oil bath was raised to 200° C. and left for 14 hours. A sample was taken for GPC analysis and the reaction mixture was diluted with 124 mL of a degassed, 50/50 solution of toluene/sulfolane and cooled to 90° C. 0.2421 grams (0.00269 mol) of anhydrous oxalic acid was added to the flask and a decrease in color and foaming were observed. The polymer slurry was precipitation in to 600 mL of 75%/25% MeOH/0.1N $H_2O$. A handheld, stainless steel homogenizer provided agitation and grinding. The polymer was isolated from the anti-solvent by vacuum filtration through a Whatman 4 filter, and washed with one, 50 mL portion of $dH_2O$. The polymer was collected and transferred to a one neck, 500 mL, round-bottomed flask containing 200 mL of $dH_2O$ and a magnetic stir bar. A reflux condenser was added to the flask and the polymer was refluxed in water for 2 hours. The polymer was isolated by vacuum filtration through a Whatman 4 filter and rinsed with two, 25 mL portions of water. The cake was removed from the filter paper, placed in to an aluminum pan and dried in vacuo at 130° C. overnight. Mw: 49,800, Mn: 13,200 Daltons, Tg was 227.0° C.

Example 13

TMBPA Polysulfone

To a 3-neck, 250 mL round bottom flask was added 10.1980 grams (0.04011 mol) of 4,4'-difluorodiphenyl sulfone, 11.4057 grams (0.04010 mol) of tetra methyl bisphenol-A (TMBPA), 6.0917 grams (0.04408 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which mixed the contents. Separately, 37 mL of sulfolane and 25 mL of toluene were combined in a graduated cylinder and degassed for 15 minutes with nitrogen gas and later combined with the contents in the flask. To the flask was equipped a 25 mL, dean-stark trap with return, and an overhead condenser.

The entire apparatus was purged with nitrogen gas for 5 minutes prior to being placed in to an oil bath maintained at 130° C. Toluene was distilled overhead to dry the reaction mixture, and water in the bottom phase of the dean-stark was discarded. The reaction mixture was kept at 130° C. for 4 hours, before the oil bath was raised to 200° C. and left for 14 hours. A sample was taken for GPC analysis and the reaction mixture was diluted with 124 mL of a degassed, 50/50 solution of toluene/sulfolane and cooled to 90° C. 0.2624 grams (0.00291 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, one neck round-bottomed flask to afford a transparent solution. The solution was allowed to cool to 40° C. prior to precipitation in to 600 mL of 75%/25% MeOH/0.1N $H_2O$. A handheld, stainless steel homogenizer provided agitation and grinding. The polymer was isolated from the anti-solvent by vacuum filtration through a Whatman 4 filter, washed with 4×25 mL portions of $dH_2O$, collected in to an aluminum pan, and dried in vacuo at 130° C. overnight. Mw: 124,400, Mn: 17,000 Daltons, Tg was 237.3° C.

Example 14

PPPBP Polysulfone

To a 3-neck, 250 mL round bottom flask was added 9.4549 grams (0.03293 mol) of 4,4'-dichlorodiphenyl sulfone, 12.6836 grams (0.03224 mol) of N-phenyl phenolphthalein (PPPBP), (0.03624 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which mixed the contents. Separately, 50 mL of N,N-dimethyl acetamide and 25 mL of toluene were combined in a graduated cylinder and degassed for 15 minutes with nitrogen gas and later combined with the contents in the flask. To the flask was equipped a 25 mL dean-stark trap with return, and an overhead condenser. The entire apparatus was purged with nitrogen for 5 minutes prior to being placed in to an oil bath maintained at 130° C. Toluene was distilled overhead to dry the reaction mixture, and water in the bottom phase of the dean-stark was discarded. The reaction mixture was kept at 130° C. for 4 hours, before the oil bath was raised to 170° C. and left for 14 hours. A sample was taken for GPC analysis and the reaction mixture was diluted to 10% solids with 84 mL of degassed N,N-dimethyl acetamide and 62 mL of degassed toluene. The reaction mixture was cooled to 90° C. and 0.2562 grams (0.00285 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, one neck round-bottomed flask to afford a transparent solution. The solution was allowed to cool to 40° C. prior to precipitation in to 600 mL of 75%/25% MeOH/0.1N $H_2O$. A handheld, stainless steel homogenizer provided agitation and grinding. The polymer was isolated from the anti-solvent by vacuum filtration through a Whatman 4 filter, washed with 4×25 mL portions of $dH_2O$, collected in to an aluminum pan, and dried in vacuo at 130° C. overnight. Mw: 67,200, Mn: 19,300 Daltons, Tg was 269.5° C.

Example 15

SBI Polysulfone

To a 3-neck, 250 mL round bottom flask was added 11.0156 grams (0.03836 mol) of 4,4'-dichlorodiphenyl sulfone, 11.7070 grams (0.03796 mol) of spiro biindane bisphenol (SBI), 5.8285 grams (0.04217 mol) of anhydrous, finely ground potassium carbonate and equipped with a thermometer adapter with rubber septum, a glass stir rod with a Teflon blade and a glass stir bearing. Nitrogen was passed through the flask for 10 minutes with minor agitation, which mixed the contents. Separately, 50 mL of N,N-dimethyl acetamide and 25 mL of toluene were combined in a graduated cylinder and degassed for 15 minutes with nitrogen gas and later combined with the contents in the flask. To the flask was equipped a 25 mL dean-stark trap with return, and an overhead condenser. The entire apparatus was purged with nitrogen for 5 minutes prior to being placed in to an oil bath maintained at 130° C. Toluene was distilled overhead to dry the reaction mixture, and water in the bottom phase of the dean-stark was discarded. The reaction mixture was kept at 130° C. for 4 hours, before the oil bath was raised to 170° C. and left for 14 hours. A sample was taken for GPC analysis and the reaction mixture was diluted to 10% solids with 84 mL of degassed N,N-dimethyl acetamide and 62 mL of degassed toluene. The reaction mixture was cooled to 90° C. and 0.2206 grams (0.00245 mol) of anhydrous oxalic acid was added to the flask and a decrease in color and foaming were observed. The polymer solution was vacuum filtered at 90° C. through a 70 mm GF/D Whatman glass fiber filter and collected in to a 250-mL, one neck round-bottomed flask to afford a transparent solution. The solution was allowed to cool to 40° C. prior to precipitation in to 600 mL of 75%/25% MeOH/0.1N $H_2O$. A handheld, stainless steel homogenizer provided agitation and grinding. The polymer was isolated from the anti-solvent by vacuum filtration through a Whatman 4 filter, washed with 4×25 mL portions of $dH_2O$, collected in to an aluminum pan, and dried in vacuo at 130° C. overnight. Mw: 86,500 Mn: 12,100 Daltons, Tg was 223.4° C.

Molecular Weight Measurement Technique 100 mg of polymer was placed in to a 4-dram vial and 10 milliliters of 10% hexafluoro 2-propanol in methylene chloride (v/v) was added by glass pipette and shaken until dissolution. The solutions were filtered through a Titan2, 0.45 um PTFE syringe filter and one drop of 1,2-dichlorobenzene was added to each LC vial by pipette prior to injection. Molecular weights were determined by GPC (Gel Permeation Chromatography) analysis with a Waters 2695 Separations Module equipped with a Polymer Labs PIgel 5 micrometer MIXED-C column and Waters 2487 PDA detector at 254 nm. Elution was effected with an isocratic solvent system of dichloromethane at 1 milliliter/minute. Mw and Mn were reported relative to polystyrene standards obtained from Polymer Labs. Each sample was run for 15 minutes with an injection volume of 5 microliters.

TGA and DSC Measurements.

Thermal Gravimetric Analysis (TGA) measurements were performed with a TA Q800 TGA. The samples were heated from 40° C. to 800° C. under nitrogen or air with a heating rate of 20° C./min.

Differential Scanning calorimetry (DSC) measurements were performed with a TA Q1000 DSC. The samples were scanned from 40° C. to 400° C. under nitrogen atmosphere at 20° C./min. The glass transition temperatures (Tg) of the polymers were determined from the second heating at the described rate.

The weight average (Mw) and number average (Mn) molecular weight for Examples 9 to 14 are shown on Table 4. Mw are all >40,000 (above the polymer entanglement length) and range from 45,000 to 124,400 which is indicative of useful mechanical properties.

TABLE 4

Molecular Weight

| | Example | | | | | | |
|---|---|---|---|---|---|---|---|
| | 9 | 10 | 11 | 12 | 13 | 14 | 15 |
| Mw Da | 45,000 | 59,000 | 70,400 | 49,800 | 124,400 | 67,200 | 86,500 |
| Mn Da | 13,400 | 13,000 | 18,900 | 13,200 | 17,100 | 19,300 | 12,100 |

Table 5 shows the glass transition temperatures of Examples 9 to 14. They are all high heat polymers with glass transition temperatures ranging from 179 to 269° C.

TABLE 5

Glass Transition Temperature (Tg)

| | Example | | | | | | |
|---|---|---|---|---|---|---|---|
| | 9 | 10 | 11 | 12 | 13 | 14 | 15 |
| Tg C | 193.9 | 179.6 | 228.9 | 227.0 | 237.3 | 269.5 | 223.4 |

In a further characterization of thermal stability the polysulfone of Examples 9 to 15 were heated in air or nitrogen, weight loss was measured as function of temperature. The onset of wt loss is reported in Table 6. For all the polysulfones of Examples 9 to 15 the onset of weight loss was over 400° C. consistent with good melt stability at their melt processing temperatures which would be 125 to 150° C. above the respective resin glass transition temperatures.

TABLE 6

TGA Onset Weight Loss

| | Example | | | | | | |
|---|---|---|---|---|---|---|---|
| | 9 | 10 | 11 | 12 | 13 | 14 | 15 |
| T (onset wt. loss) Air C | 452 | 465 | 462 | 465 | 448 | 548 | 514 |
| T (onset wt. loss) N2 C | 456 | 470 | 464 | 453 | 450 | 549 | 520 |

What is claimed is:

1. A polysulfone composition comprising:
   a molecular weight in the range of from 10,000 to 120,000 Daltons;
   a phenolic end group content less than 20 meq/kg;
   a chloride content less than 20 ppm;
   a transition metal content less than 20 ppm;
   repeating units derived from reacting one or more phenolic monomers with a dihalo diaryl sulfone;
   wherein each of the one or more phenolic monomers does not exhibit a half maximal inhibitory concentration ($IC_{50}$) less than 0.00025M for alpha or beta in vitro estradiol receptors; and
   wherein when the polysulfone composition has more than zero to 1,000 ppm of one or more residual phenolic monomers or is subjected to conditions effective to provide one or more phenolic degradation products, each of the one or more residual phenolic monomers or phenolic degradation products does not exhibit a half maximal inhibitory concentration ($IC_{50}$) less than 0.00025M for alpha or beta in vitro estradiol receptors.

2. The polysulfone composition of claim 1, wherein the one or more phenolic monomers comprises a bisphenolic monomer, a mono phenolic monomer, or a combination thereof.

3. The polysulfone composition of claim 1, wherein the one or more phenolic monomers comprises resorcinol, hydroquinone, methyl hydroquinone, t-butyl hydroquinone, di-t-butyl hydroquinones, biphenols, tetramethyl bisphenol-A, Spiro biindane bisphenols, bis-(hydroxy aryl)-N-aryl isoindolinones, or any combination thereof.

4. A polysulfone composition comprising:
   repeating units derived from reacting one or more phenolic monomers with a dihalo diaryl sulfone;
   wherein each of the one or more phenolic monomers does not exhibit a half maximal inhibitory concentration ($IC_{50}$) less than 0.00025M for alpha or beta in vitro estradiol receptors;
   wherein when the polysulfone composition has more than zero to 1,000 ppm of one or more residual phenolic monomers or is subjected to conditions effective to provide one or more phenolic degradation products, each of the one or more residual phenolic monomers or phenolic degradation products does not exhibit a half maximal inhibitory concentration ($IC_{50}$) less than 0.00025M for alpha or beta in vitro estradiol receptors; and
   wherein the polysulfone is end capped with phenol.

5. The polysulfone composition of claim 1, wherein the polysulfone composition is a polyphenylene ether sulfone.

6. The polysulfone composition of claim 1, wherein the polysulfone composition is a co-polysulfone composition comprising repeating subunits derived from a reaction of two or more phenolic monomers and the dihalo diaryl sulfone.

7. The polysulfone composition of claim 1, further comprising one or more additives, wherein each of the one or more additives does not exhibit a half maximal inhibitory concentration ($IC_{50}$) less than 0.00025M for alpha or beta in vitro estradiol receptors.

8. The polysulfone composition of claim 7, wherein the one or more additives comprises a stabilizer, antioxidant, colorant, impact modifier, flame retardant, anti drip additive, mold release additive, lubricant, plasticizer, mineral, reinforcement additive, or any combination thereof.

9. The polysulfone composition of claim 7, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

10. The polysulfone composition of claim 9, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

11. The polysulfone composition of claim 9, wherein the phosphite has a molecular weight greater than 200 Daltons.

12. A polysulfone composition comprising:
a molecular weight in the range of from 10,000 to 120,000 Daltons;
a phenolic end group content less than 20 meq/kg;
a chloride content less than 20 ppm;
a transition metal content less than 20 ppm;
a residual phenolic monomer content less than 100 ppm;
repeating units derived from reacting one or more phenolic monomers with a dihalo diaryl sulfone;
wherein each of the one or more phenolic monomers does not exhibit a half maximal inhibitory concentration ($IC_{50}$) less than 0.00025M for alpha or beta in vitro estradiol receptors; and
wherein the residual phenolic monomer does not exhibit a half maximal inhibitory concentration ($IC_{50}$) less than 0.00025M for alpha or beta in vitro estradiol receptors.

13. A polymer blend comprising:
a) a first polymer component comprising at least one polysulfone composition according to claim 1; and
b) a second polymer component comprising a polycarbonate, polyester carbonate, polyarylate, polyphenylene ether, polyamide, polyphenylene sulfide, polyester, styrene acrylonitrile, acrylonitrile butadiene styrene, methyl methacrylate, methacrylate butadiene styrene, styrene maleic anhydride, acrylic rubber, styrene butadiene styrene, styrene ethylene butadiene styrene, polystyrene, polyolefin, polyetherimide, polyetherimide sulfone, or any combination thereof.

14. An article of manufacture comprising a polysulfone composition according to claim 1.

15. A method comprising:
a) providing one or more phenolic monomers that does not exhibit a half maximal inhibitory concentration ($IC_{50}$) less than 0.00025M for alpha or beta in vitro estradiol receptors;
b) providing a dihalo diaryl sulfone; and
c) reacting the one or more phenolic monomers and the dihalo diaryl sulfone under conditions effective to provide a polysulfone;
wherein the polysulfone comprises:
a molecular weight in the range of from 10,000 to 120,000 Daltons;
a phenolic end group content less than 20 meq/kg;
a chloride content less than 20 ppm;
a transition metal content less than 20 ppm; and
wherein when the polysulfone has more than zero to 1,000 ppm of one or more residual phenolic monomers or is subjected to conditions effective to provide one or more phenolic degradation products, each of the one or more residual phenolic monomers or phenolic degradation products does not exhibit a half maximal inhibitory concentration ($IC_{50}$) less than 0.00025M for alpha or beta in vitro estradiol receptors.

16. The method of claim 15, wherein the one or more phenolic monomers comprises a bisphenolic monomer, a mono phenolic monomer, or a combination thereof.

17. The method of claim 15, wherein the one or more phenolic monomers comprises resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones, or any combination thereof.

18. The method of claim 15, wherein the dihalo diaryl sulfone comprises dichloro diphenyl sulfone.

19. The method of claim 15, wherein the polysulfone is a polyphenylene ether sulfone.

20. The method of claim 15, wherein the reaction conditions effective to provide a polysulfone comprise reacting the one or more phenolic monomers and dihalo diaryl sulfone in the presence of an end capping agent.

21. A method comprising:
a) providing one or more phenolic monomers that does not exhibit a half maximal inhibitory concentration ($IC_{50}$) less than 0.00025M for alpha or beta in vitro estradiol receptors;
b) providing a dihalo diaryl sulfone; and
c) reacting the one or more phenolic monomers and the dihalo diaryl sulfone under conditions effective to provide a polysulfone;
wherein when the polysulfone has more than zero to 1,000 ppm of one or more residual phenolic monomers or is subjected to conditions effective to provide one or more phenolic degradation products, each of the one or more residual phenolic monomers or phenolic degradation products does not exhibit a half maximal inhibitory concentration ($IC_{50}$) less than 0.00025M for alpha or beta in vitro estradiol receptors; and
wherein the polysulfone is end capped with phenol.

22. The method of claim 15, wherein the polysulfone is compounded with one or more additives and wherein each of the one or more additives does not exhibit a half maximal inhibitory concentration ($IC_{50}$) less than 0.00025M for alpha or beta in vitro estradiol receptors.

23. The method of claim 22, wherein the one or more additives comprises a stabilizer, antioxidant, colorant, impact modifier, flame retardant, anti drip additive, mold release additive, lubricant, plasticizer, mineral, reinforcement additive, or any combination thereof.

24. The method of claim 22, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

25. The method of claim 24, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

26. The method of claim 24, wherein the phosphite has a molecular weight greater than 200 Daltons.

27. The method of claim 15, wherein the polysulfone is melt processed to provide the polysulfone in a pelletized form.

28. The method of claim 27, wherein the pelletized polysulfone has a water content less than 100 ppm.

29. The polysulfone composition of claim 1, wherein the dihalo diaryl sulfone comprises dichloro diphenyl sulfone.

30. The polysulfone composition of claim 1, wherein the repeating units are derived from reacting the one or more phenolic monomers with the dihalo diaryl sulfone in the presence of an end capping agent.

31. The polysulfone composition of claim 1, wherein the polysulfone is melt processed to provide the polysulfone in a pelletized form.

32. The polysulfone composition of claim 31, wherein the pelletized polysulfone has a water content less than 100 ppm.

33. The polysulfone composition of claim 4, wherein the one or more phenolic monomers comprises a bisphenolic monomer, a mono phenolic monomer, or a combination thereof.

34. The polysulfone composition of claim 4, wherein the one or more phenolic monomers comprises resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones, or any combination thereof.

35. The polysulfone composition of claim 4, wherein the polysulfone composition is a polyphenylene ether sulfone.

36. The polysulfone composition of claim 4, wherein the polysulfone composition is a co-polysulfone composition comprising repeating subunits derived from a reaction of two or more phenolic monomers and the dihalo diaryl sulfone.

37. The polysulfone composition of claim 4, further comprising one or more additives, wherein each of the one or more additives does not exhibit a half maximal inhibitory concentration ($IC_{50}$) less than 0.00025M for alpha or beta in vitro estradiol receptors.

38. The polysulfone composition of claim 37, wherein the one or more additives comprises a stabilizer, antioxidant, colorant, impact modifier, flame retardant, anti drip additive, mold release additive, lubricant, plasticizer, mineral, reinforcement additive, or any combination thereof.

39. The polysulfone composition of claim 37, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

40. The polysulfone composition of claim 39, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

41. The polysulfone composition of claim 39, wherein the phosphite has a molecular weight greater than 200 Daltons.

42. A polymer blend comprising:
  a) a first polymer component comprising at least one polysulfone composition according to claim 4; and
  b) a second polymer component comprising a polycarbonate, polyester carbonate, polyarylate, polyphenylene ether, polyamide, polyphenylene sulfide, polyester, styrene acrylonitrile, acrylonitrile butadiene styrene, methyl methacrylate, methacrylate butadiene styrene, styrene maleic anhydride, acrylic rubber, styrene butadiene styrene, styrene ethylene butadiene styrene, polystyrene, polyolefin, polyetherimide, polyetherimide sulfone, or any combination thereof.

43. An article of manufacture comprising a polysulfone composition according to claim 4.

44. The polysulfone composition of claim 4, wherein the dihalo diaryl sulfone comprises dichloro diphenyl sulfone.

45. The polysulfone composition of claim 4, wherein the repeating units are derived from reacting the one or more phenolic monomers with the dihalo diaryl sulfone in the presence of an end capping agent.

46. The polysulfone composition of claim 4, wherein the polysulfone is melt processed to provide the polysulfone in a pelletized form.

47. The polysulfone composition of claim 4, wherein the pelletized polysulfone has a water content less than 100 ppm.

48. The polysulfone composition of claim 12, wherein the one or more phenolic monomers comprises a bisphenolic monomer, a mono phenolic monomer, or a combination thereof.

49. The polysulfone composition of claim 12, wherein the one or more phenolic monomers comprises resorcinol, hydroquinone, methyl hydroquinone, t-butyl hydroquinone, di-t-butyl hydroquinones, biphenols, tetramethyl bisphenol-A, spiro biindane bisphenols, bis-(hydroxy aryl)-N-aryl isoindolinones, or any combination thereof.

50. The polysulfone composition of claim 12, wherein the polysulfone composition is a polyphenylene ether sulfone.

51. The polysulfone composition of claim 12, wherein the polysulfone composition is a co-polysulfone composition comprising repeating subunits derived from a reaction of two or more phenolic monomers and the dihalo diaryl sulfone.

52. The polysulfone composition of claim 12, further comprising one or more additives, wherein each of the one or more additives does not exhibit a half maximal inhibitory concentration ($IC_{50}$) less than 0.00025M for alpha or beta in vitro estradiol receptors.

53. The polysulfone composition of claim 52, wherein the one or more additives comprises a stabilizer, antioxidant, colorant, impact modifier, flame retardant, anti drip additive, mold release additive, lubricant, plasticizer, mineral, reinforcement additive, or any combination thereof.

54. The polysulfone composition of claim 42, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

55. The polysulfone composition of claim 54, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

56. The polysulfone composition of claim 54, wherein the phosphite has a molecular weight greater than 200 Daltons.

57. A polymer blend comprising:
  a) a first polymer component comprising at least one polysulfone composition according to claim 12; and
  b) a second polymer component comprising a polycarbonate, polyester carbonate, polyarylate, polyphenylene ether, polyamide, polyphenylene sulfide, polyester, styrene acrylonitrile, acrylonitrile butadiene styrene, methyl methacrylate, methacrylate butadiene styrene, styrene maleic anhydride, acrylic rubber, styrene butadiene styrene, styrene ethylene butadiene styrene, polystyrene, polyolefin, polyetherimide, polyetherimide sulfone, or any combination thereof.

58. An article of manufacture comprising a polysulfone composition according to claim 12.

59. The polysulfone composition of claim 12, wherein the dihalo diaryl sulfone comprises dichloro diphenyl sulfone.

60. The polysulfone composition of claim 12, wherein the repeating units are derived from reacting the one or more phenolic monomers with the dihalo diaryl sulfone in the presence of an end capping agent.

61. The polysulfone composition of claim 12, wherein the polysulfone is melt processed to provide the polysulfone in a pelletized form.

62. The polysulfone composition of claim 12, wherein the pelletized polysulfone has a water content less than 100 ppm.

63. The method of claim 15, wherein the polysulfone is a co-polysulfone comprising repeating subunits derived from a reaction of two or more phenolic monomers and the dihalo diaryl sulfone.

64. A polymer blend comprising:
  a) a first polymer component comprising at least one polysulfone made according to the method of claim 15; and b) a second polymer component comprising a polycarbonate, polyester carbonate, polyarylate, polyphenylene ether, polyamide, polyphenylene sulfide, polyester, styrene acrylonitrile, acrylonitrile butadiene styrene, methyl methacrylate, methacrylate butadiene styrene, styrene maleic anhydride, acrylic rubber, styrene butadiene styrene, styrene ethylene butadiene styrene, polystyrene, polyolefin, polyetherimide, polyetherimide sulfone, or any combination thereof.

65. An article of manufacture comprising a polysulfone made according to the method of claim 15.

66. The method of claim 21, wherein the one or more phenolic monomers comprises a bisphenolic monomer, a mono phenolic monomer, or a combination thereof.

67. The method of claim 21, wherein the one or more phenolic monomers comprises resorcinol, hydroquinone, methyl hydroquinone, t-butyl hydroquinone, di-t-butyl hydroquinones, biphenols, tetramethyl bisphenol-A, Spiro biindane bisphenols, bis-(hydroxy aryl)-N-aryl isoindolinones, or any combination thereof.

68. The method of claim 21, wherein the polysulfone composition is a polyphenylene ether sulfone.

69. The method of claim 21, wherein the polysulfone composition is a co-polysulfone composition comprising repeating subunits derived from a reaction of two or more phenolic monomers and the dihalo diaryl sulfone.

70. The method of claim 21, further comprising one or more additives, wherein each of the one or more additives does not exhibit a half maximal inhibitory concentration ($IC_{50}$) less than 0.00025M for alpha or beta in vitro estradiol receptors.

71. The method of claim 70, wherein the one or more additives comprises a stabilizer, antioxidant, colorant, impact modifier, flame retardant, anti drip additive, mold release additive, lubricant, plasticizer, mineral, reinforcement additive, or any combination thereof.

72. The method of claim 70, wherein the one or more additives comprises a phosphite and wherein when the phosphite is subjected to conditions effective to provide one or more phosphite hydrolysis products, each of the one or more phosphite hydrolysis products does not exhibit a half maximal inhibitory concentration ($IC_{50}$) less than 0.00025M for alpha or beta in vitro estradiol receptors.

73. The method of claim 72, wherein the phosphite comprises a diphenyl alkyl phosphite, phenyl dialkyl phosphite, trialkyl phosphite, dialkyl phosphite, triphenyl phosphite, diphenyl pentaerythritol diphosphite, or any combination thereof.

74. The method of claim 72, wherein the phosphite has a molecular weight greater than 200 Daltons.

75. A polymer blend comprising:
a) a first polymer component comprising at least one polysulfone made according to the method of claim 21; and
b) a second polymer component comprising a polycarbonate, polyester carbonate, polyarylate, polyphenylene ether, polyamide, polyphenylene sulfide, polyester, styrene acrylonitrile, acrylonitrile butadiene styrene, methyl methacrylate, methacrylate butadiene styrene, styrene maleic anhydride, acrylic rubber, styrene butadiene styrene, styrene ethylene butadiene styrene, polystyrene, polyolefin, polyetherimide, polyetherimide sulfone, or any combination thereof.

76. An article of manufacture comprising a polysulfone made according to the method of claim 21.

77. The method of claim 21, wherein the dihalo diaryl sulfone comprises dichloro diphenyl sulfone.

78. The method of claim 21, wherein the reaction conditions effective to provide a polysulfone comprise reacting the one or more phenolic monomer and dihalo diaryl sulfone in the presence of an end capping agent.

79. The method of claim 21, wherein the polysulfone is melt processed to provide the polysulfone in a pelletized form.

80. The method of claim 21, wherein the pelletized polysulfone has a water content less than 100 ppm.

* * * * *